United States Patent Office 3,362,758
Patented Jan. 9, 1968

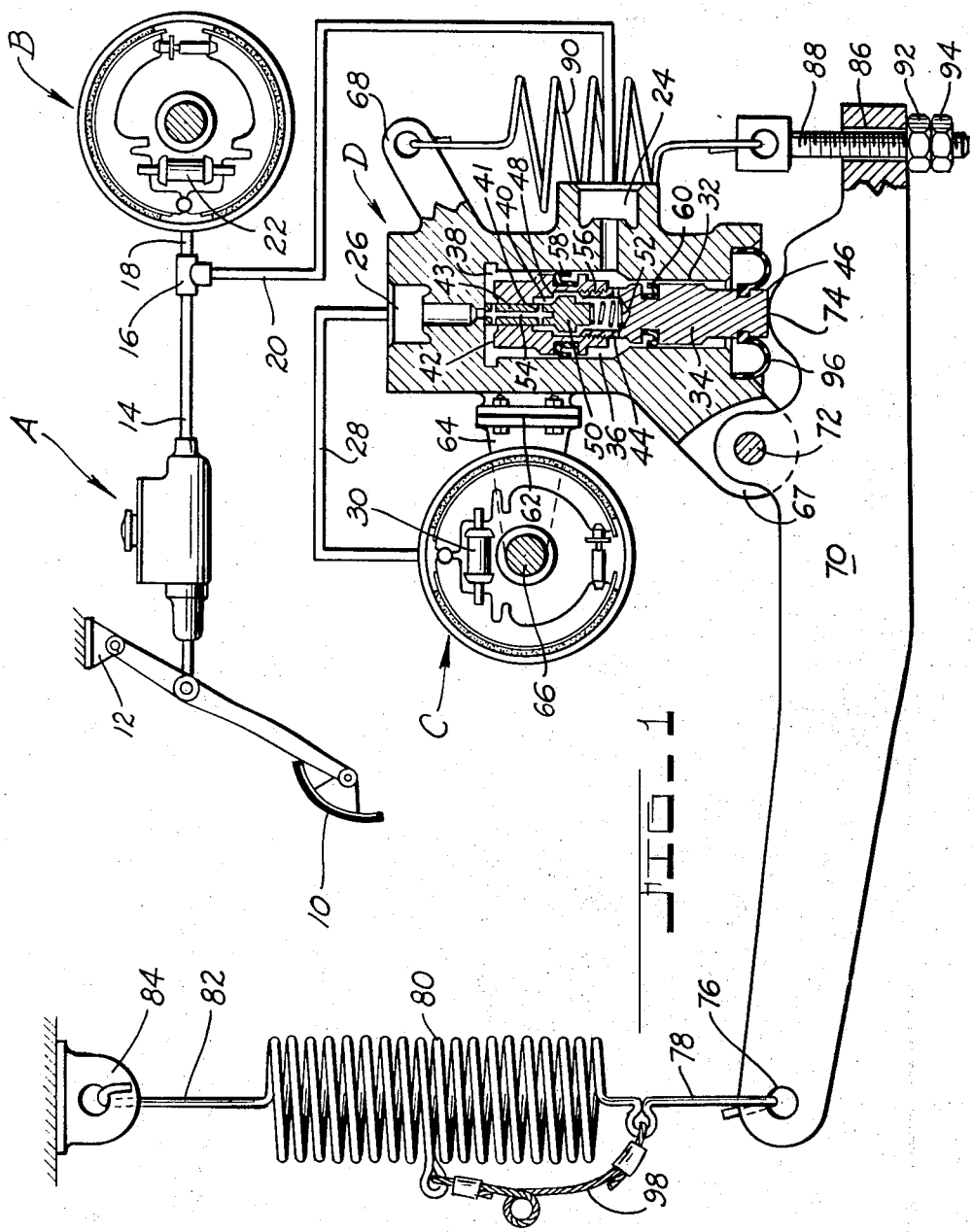

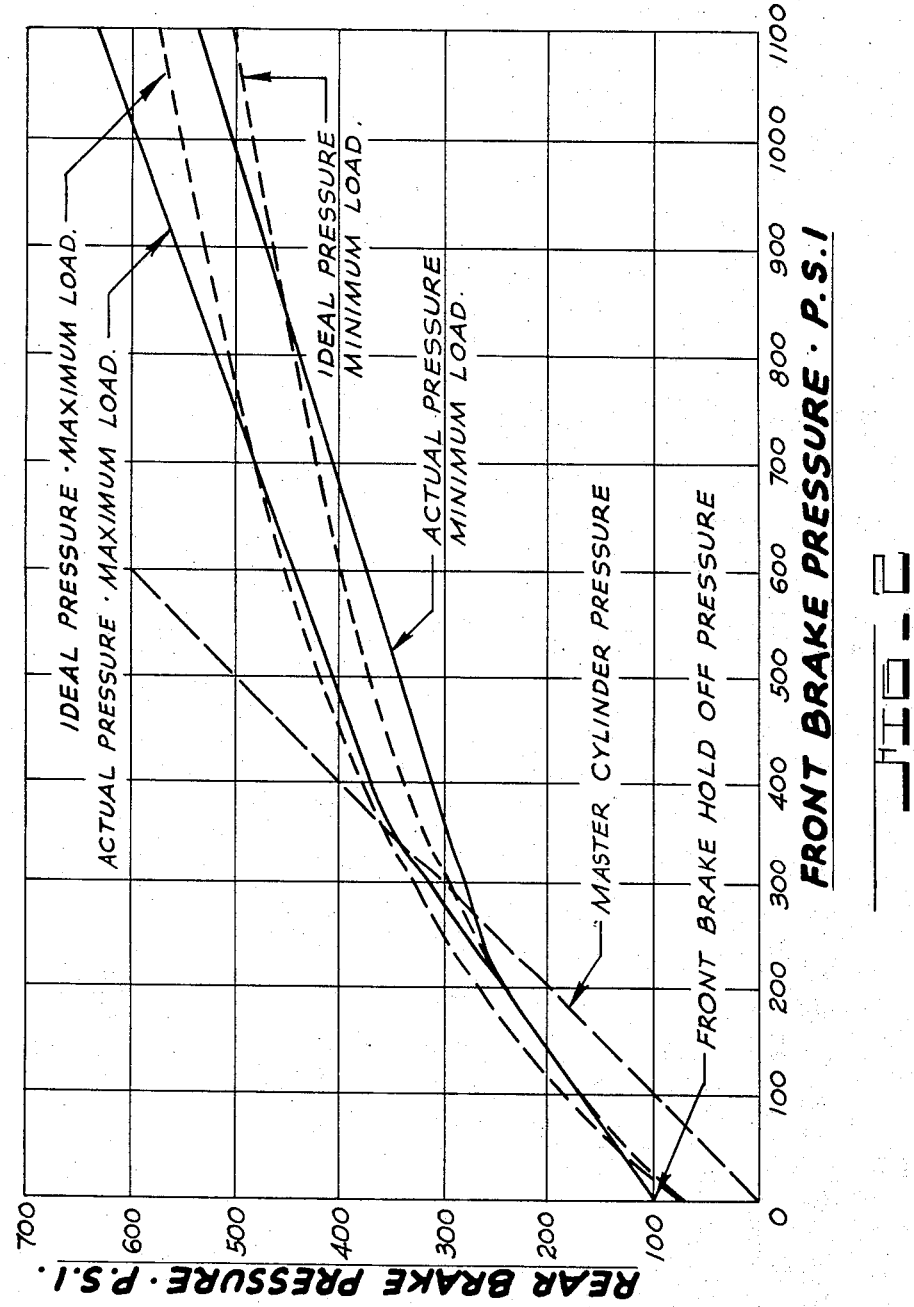

3,362,758
BRAKE PROPORTIONING MEANS
Frederick E. Goerke and Robert T. Eddy, South Bend, Ind., assignors to The Bendix Corporation, a corporation of Delaware
Filed Feb. 21, 1966, Ser. No. 529,062
1 Claim. (Cl. 303—22)

This invention relates to a fluid pressure braking system and more particularly to a fluid pressure braking system having a means to proportion delivery of fluid pressure between the front and rear axle brakes of the vehicle.

Because the center of gravity of the vehicle must be of finite distance above the surface upon which the vehicle is traveling, it has long been understood that a weight shift takes place in the direction of travel when the vehicle is decelerated by means of the brakes. In order to provide effective braking during the weight shift it has been the object of vehicle manufacturers to provide a fixed ratio of areas in front and rear wheel cylinders which is roughly proportional to the ratio of weights supported by the front wheels to the weights supported by the rear wheels when the vehicle is being decelerated at about .7g or in the range of 20 to 25 ft./sec./sec. Obviously, this compromise is not satisfactory, since it provides "optimum" braking at only one road coefficient, and results in premature front wheel slides when the coefficient is less than that for optimum braking, and premature rear wheel slide when the coefficient is greater than that for optimum braking.

There are many factors to consider in designing and developing a pressure regulating device to effect optimum brake balance; i.e., brake torque characteristics, brake effectiveness at any speed, and as mentioned above, axle loading and weight shift. Compromises must be made for all these factors in order to obtain maximum deceleration and vehicle control under all conditions.

As it will be later shown, a curve representing the ideal relationship between front and rear braking effectiveness is not linear in form. In fact, the abovementioned present day braking systems provide relationship which will plot as a straight line with a fixed slope. In attempting to approach the ideal relationship between front and rear braking, earlier inventors have introduced valves, pressure boosters, or deboosters, etc. into the system so that the braking ratio will be changed at one or more points. Therefore, it is a principal object of this invention to provide a closer approximation of a desired curve with respect to vehicle loading and weight shift than heretofore possible.

In other words, it is a principal object of this invention to provide a brake pressure regulating device that is sensitive to variations between sprung and unsprung masses in order to optimize braking effectiveness.

It is yet another object of this invention to provide a means for sensing an axle loading by the height of a vehicle chassis therefrom in proportioning the braking pressures for the braking system of the vehicle.

Still another object of this invention is to provide a means for sensing the axle loading and weight shift of the vehicle which will not create adverse loading on the pressure regulating device.

A still further and more detailed object of this invention is to provide a pressure proportioning valve mounted on an axle differential housing so that proportioning is determined by the relationship (distance) of the rear axle to the chassis via a load sensing spring attached to the chassis to apply a force to a lever which, when overcoming a valve loading spring produces a resultant force on a valve means.

Other and further objects of this invention will be readily understood by those skilled in the art to which it relates from the following description of the drawings in which:

FIGURE 1 is a schematic layout showing a proportioning valve in accordance with the principles of our invention in cross section of a vehicle braking system embodying the principles of our invention; and FIGURE 2 is a graphical illustration of the performance of a brake proportioning system in accordance with the showing of FIGURE 1.

With particular reference now to FIGURE 1 there is shown a vehicle braking system having a master cylinder A for providing braking pressure to a front axle brake B and a rear axle brake C with a brake proportioning device D operatively arranged between the master cylinder and the rear axle brake.

The master cylinder, while shown as being of a familiar type, may well be of the split system type wherein independent braking pressures are developed for the front brakes and rear brakes of the vehicle. In any event it is operated by a brake pedal 10 pivoted from the vehicle structure, as at 12. Fluid from the master cylinder, as shown, is conducted via a conduit 14 to a T-fitting 16 and via conduits 18 and 20 to the front brake wheel cylinder 22 and an inlet port 24 of the brake proportioning device. The brake proportioning device has an outlet port 26 to which a conduit 28 is affixed that leads to a rear brake wheel cylinder 30. The front wheel cylinder 22 and the rear wheel cylinder 30 may be of equal displacement to thereby enable a vehicle manufacturer to interchange wheel cylinders without the expense heretofore necessitated by maintaining stock of different wheel cylinders for the front brakes as respects the rear brakes.

Fluid entering the inlet 24 of the proportioning device D passes into a stepped diameter bore 32 in which a complementary stepped differential piston 34 is reciprocally mounted to divide said bore into a first variable volume chamber 36 and a second variable volume chamber 38. The piston is provided with an internal chamber 40 that communicates with radial openings 41 in a valve stem 43 that is axially drilled as at 54 open to the chamber 38 and via radial openings 44 to chamber 36.

The internal chamber 40 is formed with a valve seat 48 arranged to cooperate with a valve 50 on the stem 43 that is biased thereagainst by a spring 52 between the valve and the lower end of the passage in the piston. The passage 54 in the stem is aligned with the outlet port 26. In the rest position shown where piston 34 is biased upwardly, the spring 52 has urged the valve 50 to abut the uppermost end of the housing about the chamber 38.

The piston 34 is formed of two parts that are threaded together as at 56 to enable the assembly of the valve 50 within the chamber 40 thereof. Also seals 58 and 60 are affixed to each portion of the piston 34 to maintain the integrity of the variable volume chamber 36. As seen the seal 58 is arranged to prevent fluid flow from the chamber 36 to the chamber 38 about the periphery of the piston, while permitting reverse flow in the event passage 54 is plugged or valve 50 is stuck.

The brake proportioning valve D is mounted as at 62 to a pad 64 affixed to the rear axle 66 of the vehicle. Furthermore, the housing of the brake proportioning device is provided with a bifurcated ear 67 at its lowermost extremity and another ear 68 at its uppermost extremity. A lever 70 is pivotally mounted to the ear 67 by means of a pin 72 in order to pivot thereabout. This lever 70 has a surface 74 abutting the surface 46 of the piston 34 for operating the piston. At the extreme left end, as shown, the lever 70 is provided with a drilled opening 76 through which a depending leg 78 of a coil spring 80 is affixed. The coil spring 80 has an upwardly extending leg 82 that is mounted to an eyelet 84 affixed to the vehicle structure. At the other end of the lever 70 there is another drilled opening 86 through which a bolt 88 is inserted for mounting a coil spring 90 between the ear 68 and the extreme right end of the lever 70. As seen, the bolt 88 is provided with an adjusting nut 92 and a lock nut 94 for adjusting the tension of the spring 90. The mounting of the spring 90 could be exactly like the mounting of the spring 80 to the lever 70 and the pin 72 would be of an eccentric design to provide the adjusting features now provided by the nut 92. Before passing on, it should be noted that a diaphragm type seal 96 is affixed to the housing of the proportioning device D and the piston 34 adjacent the surface 46 so as to prevent the introduction of contaminants to the bore 32.

This design provides for internal piston movement to compensate for volume expansion of the output fluid thereby reducing valve hysteresis as input pressure is decreased and improves output controllability. In addition, this novel arrangement makes possible the relatively high preloads in relation to required low system rates using practical spring dimension. This is very important because of the very high travels between the body and axle (as when the vehicle is put on a body hoist) allowing one to keep the maximum spring stress within practical limits.

It should also be pointed out that the above described arrangement provides convenient means for adjusting valve preload to compensate for vehicle and proportioning valve tolerances, and, by changing the preload and/or rate of the springs, a proportioning valve such as aforedescribed has a wide latitude of application.

In an actual test of the above-described system with only one modification, namely the installation of a pressure hold-off valve in the conduit 18 so that front brake pressure cannot be developed until the rear pressure has reached approximately 100 p.s.i., the graph of FIGURE 2 is illustrative of the avantages of a braking system embodying the principles of our invention. In constructing this system for test, the ideal front vs. rear pressure relationship was calculated considering brake torque characteristics for a fully loaded and an unloaded vehicle, this relationship being shown in FIGURE 2 by the dashed lines. It was determined that the slope of these ideal curves above 500 p.s.i. (front pressure) as seen in FIGURE 2, determined the proportioning ratio desired of our valve in this installation.

As may be realized, in the static position the proportioning of the valve D is done due to the differential area on the piston 34 between the chambers 36 and 38 due to area 42 being greater than the effective area opposing it. During dynamic conditions, the variations in space between the vehicle chassis and the rear axle will impart a force to the lever 70 via the spring 80 so as to position the piston to vary the input/output ratio of the valve. The spring 90 in combination with the fluid system response will serve to compensate for the effect of minor disturbances due to road shocks on the wheel; and, as above indicated, the low rate of spring 80 will permit the servicing of the vehicle by hoisting or jacking without exceeding its maximum spring stress.

We have also found that multiple stage proportioning can be accomplished by incorporating a means to provide a variable rate in the actuating spring 80. This is accomplished by applying a limited force to spring 80 before assembly.

A cable 98 is affixed to one of the coils in the expanded condition and to the leg 82 or 78. Thus, at a predetermined expansion of spring 80 the unrestricted coils provide a higher rate in that the coils restrained by the cable are inactive when the cable is taut. With such an arrangement the actual pressure curves of FIGURE 2 were given three distinct slopes instead of the two shown, to more nearly follow the curvilinear ideal pressure as illustrated by FIGURE 2.

The lever 70 may be pinned to the projecting portion of piston 34 to provide a negative force on the piston in vehicles where the desired proportioning point is at a low level.

Other objects and advantages of this invention will appear to those skilled in the art from a reading of the appended claims.

We claim:
1. In a hydraulic braking system, a means for substantially equalizing displacement and effectiveness of a multiplicity of fluid pressure operated motors, said means comprising:
   a valve means including inlet and outlet ports in a housing containing a valve for controlling fluid communication therebetween with a valve stem projecting from said housing;
   a valve operating lever pivotally attached intermediate its ends to said housing, said lever having a surface thereon that is operatively associated with said valve stem for operating said valve;
   a low-rate spring having one end affixed to surrounding structure and the other end affixed to said lever for operating said lever whenever a variation in distance between the surrounding structure and said lever occurs;
   a means to vary the rate of the low-rate spring to provide a multiple stage loading of the valve means whenever the distance varies between the surrounding structure and said lever to cause said lever to actuate said valve stem;
   a high-rate spring connecting said housing to the other end of said lever to preload the operative connection of said lever with said stem to control the travel of said stem in controlling the fluid communication via said valve means; and
   means to adjust the high-rate spring to increase or decrease the preload on the lever to thereby regulate the static position of the valve means.

References Cited

UNITED STATES PATENTS

| 3,167,360 | 1/1965 | Oberthur | 303—6 X |
| 3,188,149 | 6/1965 | Pekrul | 303—22 |
| 3,191,999 | 6/1965 | Cordiano | 303—22 |
| 3,233,947 | 8/1966 | Oberthur | 303—22 |

FOREIGN PATENTS

| Ad. 83,114 | 5/1964 | France. |
| | | (1st add. to 1,322,232). |
| 1,322,232 | 2/1963 | France. |

EUGENE G. BOTZ, *Primary Examiner.*